United States Patent
Adams et al.

[15] 3,694,478
[45] Sept. 26, 1972

[54] PROCESS FOR GRAFTING ORGANOPOLYSILOXANES

[72] Inventors: Patrick James Adams; Richard Newton Lewis, both of Tucumseh, Mich.

[73] Assignee: Stauffer Chemical Company, New York, N.Y.

[22] Filed: Nov. 23, 1970

[21] Appl. No.: 92,133

Related U.S. Application Data

[63] Continuation of Ser. No. 789,607, Jan. 7, 1969, abandoned.

[52] U.S. Cl. .........260/448.2 E, 260/18 S, 260/23 R, 260/37 SB, 260/46.5 G, 260/448.8 R, 260/825, 260/827, 260/DIG. 28
[51] Int. Cl. .........................C07f 7/08, C08g 47/10
[58] Field of Search....260/827, 95 C, 95 R, DIG. 28, 260/448.2 E

[56] References Cited

UNITED STATES PATENTS

| | | | |
|---|---|---|---|
| 2,716,128 | 8/1955 | West | 260/827 |
| 3,555,109 | 1/1971 | Getson | 260/827 |
| 3,436,252 | 4/1969 | Neuroth | 260/827 |
| 3,538,190 | 11/1970 | Meredith et al. | 260/878 |

*Primary Examiner*—Samuel H. Blech
*Attorney*—Marion D. Ford

[57] ABSTRACT

An improved process for grafting organopolysiloxanes which comprises the gradual addition of a free-radical initiator to a heated mixture containing an organopolysiloxane and an unsaturated organic monomer in order to control the temperature. By such gradual addition, the temperature is maintained in the optimum range for the preparation of modified organopolysiloxanes.

7 Claims, No Drawings

PROCESS FOR GRAFTING ORGANOPOLYSILOXANES

This application is a continuation application of application Ser. No. 789,607, filed on Jan. 7, 1969 and now abandoned.

This invention relates to modified organopolysiloxanes and particularly to an improved process for preparing modified organopolysiloxanes.

It is known that organopolysiloxanes may be grafted with unsaturated organic monomers and that some of the products have very desirable properties. Particularly desirable properties are obtained when the grafting is carried out under such conditions that elongated particulate matter is generated in situ. For example, a hydroxyl-terminated polydimethylsiloxane may be grafted with butyl acrylate and styrene in the presence of a free-radical initiator under controlled conditions of temperature and shear rate to produce a modified polysiloxane containing elongated particulate matter which has a strong reinforcing effect on the cured product.

Unfortunately, graft polymerization is accompanied by the evolution of heat. In small-scale preparations, this does not present a problem, however, as the batch sizes increase it becomes increasingly difficult to remove the heat of reaction. In such cases, the temperature rises beyond the desirable upper limit and the properties of the product suffer. In particular, when the temperature rises above about 150° C., the desirable elongated particles are not formed. Large-scale commercial batch reactors not only fail on this account to produce the desired product, but constitute a serious hazard because of the unavoidable temperature rise.

Various types of continuous reactors have been used in an attempt to overcome these problems. Some have, in fact, shown promise in removing the heat of reaction. Without exception, however, they are high-shear devices that do not permit the formation of the desired elongated particles.

It is an object of this invention to control the evolution of heat in graft polymerization and thereby to maintain the temperature in a desirable range. Another object of this invention is to prepare modified organopolysiloxanes containing in situ-generated elongated particulate matter. Still another object of this invention is to prepare modified room-temperature-curable organopolysiloxanes having improved properties. A further object of this invention is to minimize the amount of initiator used in grafting, and thus avoid cross-linking of the grafted organopolysiloxanes.

The foregoing objects and others which will become apparent from the following description are accomplished in accordance with this invention, generally speaking, by mixing an organopolysiloxane with one or more unsaturated organic monomers, heating to the desired reaction temperature, and gradually adding a free-radical initiator. The initiator addition may be continuous or intermittent, however, at no time should enough initiator be present to cause the polymerization of all or a major part of the monomers.

This invention is based on the novel concept that the conversion of monomers to graft polymers, and hence the evolution of heat, is limited by the amount of initiator present.

We have discovered that graft polymerization may be controlled by adding a small amount of initiator, observing a small rise in temperature, followed by a drop in temperature as the initiator is consumed, and repeating the process until the polymerization is essentially complete. Equally good control is obtained by slow, continuous addition of initiator, where it can be demonstrated that the steady-state concentration of initiator never exceeds a safe limit.

The graft organopolysiloxanes prepared by the method of this invention correspond to the general formula:

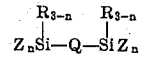

wherein the R's, which may be the same or different, represent monovalent hydrocarbon radicals and Q represents a siloxane radical of the formula:

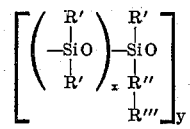

wherein the R''s, which may be the same or different, represent monovalent hydrocarbon radicals, halogenated monovalent hydrocarbon radicals or cyanoalkyl radicals; R'' is a divalent hydrocarbon radical; R''' is a polymeric organic radical linked to R'' by a carbon-to-carbon linkage; Z may be a monovalent hydrocarbon group which may be the same as R or a functional group which may be hydrolyzable or condensible, such as hydrogen, hydroxyl, amino, amido, aminoxy, oximo, halogen, aryloxy, acyloxy, alkoxy, or phosphato groups; $n$ is an integer of from 1 to 3; $x$ is an integer of from 0 to 20,000; and $y$ is an integer of from 1 to 500.

The organopolysiloxanes used in the grafting step may be represented by the formula:

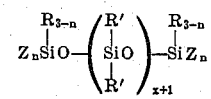

wherein R, R' Z, $n$, and $x$ are the same as those described above. In the above formula, R and R', which may be the same or different, represent organic radicals, such as alkyl radicals, e.g., methyl, ethyl, propyl, and butyl radicals; and aryl radicals, e.g., phenyl, tolyl, and chlorophenyl.

The grafted organopolysiloxanes consist of an organosiloxane polymer having attached thereto one or more side chains or branches consisting of a carbon-chain polymer. In preparing these compositions, hydrogen is abstracted from the organopolysiloxane polymer by free-radical initiators to form an active site for grafting the organic polymer thereto.

It will be understood that in the grafting process a certain amount of organic homopolymer is unavoidably formed as a by-product. The term "modified organopolysiloxane" is meant to include the entire nonvolatile reaction product, including grafted organopolysiloxane, organic homopolymer, and residual ungrafted organopolysiloxane.

The organosiloxane polymer should be one which is capable of forming free radicals by hydrogen abstraction and should be substantially free of any tendency to undergo further polymerization under the conditions employed. Thus, the siloxane polymer should be one which is substantially free of any aliphatic unsaturation. It is preferred that the organopolysiloxane have methyl radicals attached to the silicon atoms.

Examples of suitable organosiloxane polymers and copolymers which may be used in the formation of the modified polymers are polydimethylsiloxanes, copolymers of dimethylsiloxane and methylphenyl- or diphenyl-siloxane units, hydroxyl-terminated siloxane fluids, and trimethylsiloxy-endblocked polymers of dimethylsiloxanes.

The viscosity of the organosiloxane polymer used in preparing the modified organopolysiloxanes has a profound effect on the physical properties of the polymers. Even though the viscosity of the organopolysiloxane fluid used in the grafting step may vary over a wide range, it is preferred that the viscosity of the fluid be from about 100 to about 20,000 cs. at 25° C., preferably from about 250 to 10,000 cs.

The proportion of organopolysiloxanes used in the grafting step may be varied within wide limits. However, it is found that optimum physical properties are obtained when the siloxane comprises from 25 to 60 percent of the reactants. Higher proportions may be used, but the properties of the resulting modified siloxane are inferior. When the siloxane content is below about 25 percent of the reactants, the organic polymer becomes a continuous phase, and a semisolid product may result. Even though the proportion of organopolysiloxane polymer may be below about 25 percent by weight based on the weight of the reactants, it is preferred that the organopolysiloxane concentration be from about 25 to about 60 percent of the reactants.

Any polymerizable organic monomer having aliphatic unsaturation may be grafted to the organosiloxane polymer. Examples of suitable olefinic compounds are low molecular weight straight-chain hydrocarbons, such as ethylene, propylene, butylene; vinyl halides, such as vinyl fluoride and vinyl chloride; vinyl esters, such as vinyl acetate, styrene, ring-substituted styrenes, and other aromatics, such as vinyl-pyridine and vinylnapthalene; acrylic acid and derivatives of acrylic acid, including the salts, esters, amides, and acrylonitrile; N-vinyl compounds, such as N-vinyl-carbazole, N-vinylpyrrolidone, and N-vinylcaprolactam; and vinylsilicon compounds, such as vinyltriethoxysilane.

Disubstituted ethylenes of the type $CH_2{=}CX_2$ may be used, including vinylidene fluoride, vinylidene chloride, vinylidene cyanide, methacrylic acid, and compounds derived therefrom, such as the salts, esters, and amides as well as methacrolein, methacrylonitrile, and the like.

Disubstituted ethylenes of the type $CHX{=}CHX$, such as vinylene carbonate and various monomers which polymerize best in the presence of other monomers, e.g., maleic anhydride, esters of maleic and fumaric acids, stilbene, indene, and coumarone, may be used in the formation of these modified polymers.

As emphasized before, the monomers may be used singly or in combinations of two or three or even more.

Suitable initiators are organic peroxides and certain azo-compounds in which both the nitrogen atoms of the 220 linkage are attached to a tertiary carbon atom, and the remaining valences of the tertiary carbon atom are satisfied by nitrile, carboxy, alkyl, cycloalkylene, or alkyl radicals, preferably having from one to 18 carbon atoms.

Examples of suitable peroxide initiators are compounds of the formula ROOH, ROOR, RCOOOR, or $(RCOO)_2$ in which R is an organic radical. Specific examples of peroxides which are operative in this invention are hydroperoxides, such as t-butyl hydroperoxide, cumene hydroperoxide, and decalin hydroperoxide; dialkyl peroxides, such as di-t-butyl and dicumyl peroxide; diacyl peroxides, such as benzoyl peroxide; cyclic peroxides, such as ascaridole; diperoxides, such as 2,5-dimethyl-2,5-di-t-butyl-peroxyhexane; peresters, such as t-butyl perbenzoate, t-butylperoxy isopropyl carbonate, and t-butyl peroctoate; keto peroxides, such as acetone peroxide and cyclohexanone peroxide.

The amount of initiator used is rather critical, and is generally less than the amount required to obtain high conversion when it is all added at the beginning. Thus, the process of this invention affords a more efficient utilization of the initiator. When the initiator is added in small increments, the total amount required may be as little as 0.01 percent of the weight of monomers to be polymerized, although with less reactive monomer systems as much as 1.0 percent may be required.

It may be desirable to dilute the initiator with an inert solvent, particularly when a normally solid initiator is employed. In such cases, the concentration of initiator may be as low as 1 percent or less, but is preferably in the range of from about 5 to about 20 percent. Any solvent with low chain-transfer activity may be used. Examples of suitable solvents include benzene, toluene, xylene, chlorobenzene, cyclohexane, and ethyl acetate.

Several considerations determine the choice of temperature to be used in the graft polymerization, although generally speaking, temperatures in the range of about 50° to 150° C. will be found suitable. It is important to avoid temperatures high enough to cause rapid and spontaneous polymerization of the monomers at the concentrations employed. The monomers of this invention generally do not undergo such rapid polymerization when mixed with organopolysiloxanes at a temperature below 150° C. Another consideration is the in situ generation of elongated particulate matter that may have a reinforcing effect on the resulting modified organopolysiloxane; the optimum range for the generation of such particulate matter is 50° to 150° C.

For best results and convenient reaction times, the temperature and initiator should be chosen so that the half-like is between about 15 minutes and 10 hours, preferably between about 1 hour and 4 hours. Temperatures outside there ranges may be used, but only at some sacrifice in physical properties. Table I shows the optimum temperature ranges for various free-radical initiators.

TABLE I

| Initiator | Four-hour half-life Temperature, °C. | Preferred temperature range, °C. |
|---|---|---|
| 2,4-dichlorobenzoyl peroxide | 61 | 60 – 75 |
| Azobisisobutyronitrile | 73 | 70 – 85 |
| Benzoyl peroxide | 79 | 75 – 90 |
| t-butyl peroctoate | 80 | 75 – 90 |
| 1,1-di-t-butylperoxy-3,3,5-trimethylcyclohexane | 101 | 100 – 110 |
| t-butylperoxy isopropyl carbonate | 107 | 105 – 115 |
| t-butyl perbenzoate | 113 | 110 – 125 |
| Di-t-butyl peroxide | 135 | 130 – 145 |

The hydroxyl-terminated modified organopolysiloxanes may be used as room-temperature-curable elastomers. For example, in a one-component system, the modified polymer may be end-blocked with groups which are hydrolyzable in ambient moisture. Silanes of the general formula $X_{4-m}SiY_m$ wherein X is a relatively unreactive group, such as alkyl, alkoxy, or aryl; Y is acyloxy, oximo, alkoxy, aryloxy, halogen, aminoxy, or phosphato groups; and m is an integer of from 2 to 4, are added as end-blocking agents to hydroxyl-terminated modified organopolysiloxanes, thereby converting the hydroxyl groups to functional groups of the type $OSiX_{4-m}Y_{m-1}$ which are hydrolyzable in ambient moisture. These compositions may be cured by merely exposing them to atmospheric moisture with or without any additional water vapor at times varying from a few minutes to several hours or days.

Examples of suitable silanes which may be used in the one-component system are methyltriacetoxysilane, isopropyltriacetoxysilane, isopropoxytriacetoxysilane, methyltriacetoximosilane, methyltris-diethylaminoxysilane, methyltris(diethylphosphato)silane and the like.

In the two-component system, hydroxyl-terminated modified organopolysiloxanes are mixed with curing agents, such as polyalkoxysilanes of the formula $(R^aO)_zSiR_{4-z}^b$ or polyalkoxysiloxanes in which the silicon atoms are linked through Si—O—Si linkages and the remaining valences of the silicon atom are satisfied by $R^aO$ and $R^b$. In the above formula, the groups represented by $R^a$ and $R^b$ are monovalent hydrocarbon radicals having less than eight carbon atoms, and z has a value of from 3 to 4.

Examples of monovalent hydrocarbon radicals are methyl, ethyl, propyl, butyl, hexyl, octyl, phenyl, vinyl, allyl, ethylallyl, butadienyl, and the like. The polyalkoxysilanes used herein include mono-organotrihydrocarbonoxysilanes, tetrahydrocarbonoxysilanes, and partial hydrolyzates of such silanes. The polyalkoxy compounds, e.g., alkyl silicates: ethyl orthosilocate or partially hydrolyzed ethyl silicates, such as ethyl silicate "40" which consists primarily or decaethyl tetrasilicate, are representative examples of these compounds. Other operative curing agents are ethyltrimethoxysilane, methylbutoxydiethoxysilane, propyltripropoxysilane, methyltriethoxysilane, ethyltriethoxysilane, ethyl orthosilicate, and n-butyl orthosilicate. Examples of alkyl polysilicates are ethyl polysilicate, isopropyl polysilicate, butyl polysilicate, dimethyltetraethoxydisiloxane, trimethylpentabutoxytrisiloxane, and the like.

The polyalkoxysilanes and polyalkoxysiloxanes employed herein may be used either alone or in combination. They should be used in a proportion of from about 0.5 to about 20 percent or preferably from about 1 to 10 percent by weight based on the weight of the organopolysiloxane. If the total weight of the polyalkoxysilanes or polyalkoxysiloxanes employed is below about 0.5 percent based on the weight of the modified organopolysiloxanes, the cure rate is extremely slow. If, on the other hand, the total weight of the polyalkoxysilanes or polyalkoxysiloxanes is above 10 percent based on the weight of the modified organopolysiloxane, the cure time will not be substantially reduced.

The modified organopolysiloxane compositions are cured by mixing the hydroxyl-terminated organopolysiloxanes with the polyalkoxysilanes or the polyalkoxysiloxanes in the presence of a catalyst, preferably a metallic salt or compound. The metallic component of the catalyst is preferably tin, but may be lead, chromium, antimony, iron, cadmium, barium, calcium, titanium, bismuth, or magnesium. Examples of suitable salts are tin naphthenate, lead octoate, tin octoate, iron stearate, tin oleate, antimony octoate, tin butyrate, and the like. Organotin catalysts which may be used include dibutyltin dilaurate, bis(dibutylphenyltin) oxide, bis(acetoxydibutyltin) oxide, bis(tributyltin) oxide, dibutoxydibutyltin, tri-t-butyltin hydroxide, triethyltin hydroxide, diamyldipropoxytin, dioctyltin dilaurate, diphenyloctyltin acetate, dodecyldiethyltin acetate, trioctyltin acetate, triphenyltin acetate, triphenyltin laurate, triphenyltin methacrylate, dibutyltin butoxychloride, and the like. These catalysts may be dispersed in a solvent and then added to the hydroxyl-terminated modified organopolysiloxanes or they may be dispersed on a suitable filler or additive and thereafter milled with a modified polymer. Examples of suitable hydrocarbon solvents are benzene, toluene, xylene, and the like. Also, halogenated hydrocarbons, such as tetrachloroethylene or chlorobenzenes; organic ethers, such as diethyl ether, dibutyl ether, and hydroxyl-free fluid polysiloxanes, may be used as solvents. It is preferred that the solvent be sufficiently volatile to evaporate off at room temperature. The amount of catalyst used in these curing systems may range from 0.05 to about 2 percent by weight, preferably from about 0.1 to about 1 percent by weight based on the weight of the composition. A mixture of two or more of the catalysts mentioned above may be used if desired. The amount of catalyst added to the composition is determined by the requirements of the particular job, especially the pot life or working time required.

Although not essential, fillers may be incorporated in these curable organopolysiloxane compositions to further improve upon the physical properties for some commercial applications. Examples of suitable fillers are fumed silicas, high-surface-area precipitated silicas, silica aerogels, as well as coarser silicas, such as diatomaceous earth, crushed quartz and the like. Other fillers which may be used are metallic oxides, such as titanium oxide, ferric oxide, zinc oxide; fibrous fillers, such as asbestos, fibrous glass, and the like. Additives, such as pigments, antioxidants, ultraviolet absorbers, and the like, may be included in these compositions.

The compositions of this invention show increased lubricity, increased thermal stability and stability towards hydrolysis. These compositions are useful as lubricants, elastomeric gaskets, sealants, encapsulants, and protective coatings.

Various embodiments of this invention are further illustrated by the following examples in which all parts are by weight.

EXAMPLE 1

A mixture consisting of 80 parts of hydroxyl-terminated polydimethylsiloxane (400 cs.) and 120 parts of butyl acrylate was heated to 116° C. in an oil-bath maintained at 129° C. and agitated at 250 r.p.m. A solution of 0.3 parts of t-butyl perbenzoate in 5 parts of toluene was added in one portion. An uncontrolled polymerization ensued and the temperature increased rapidly to 171° C. before the mixture could be cooled. Further addition of initiator had no visible effect, indicating that the reaction was complete in the first few minutes. The product was white, opaque in color, had a viscosity of 10,600 cp. at 25° C. and contained spherical particles of about 60 microns in diameter.

EXAMPLE 2

A graft polymerization was carried out in accordance with the procedure described in Example 1, except that the toluene solution containing 6 percent of t-butyl perbenzoate was added dropwise. After 0.1 part of the solution had been added, a haziness developed and the temperature increased to 123° C., where it was maintained by the gradual addition of the t-butyl perbenzoate solution. After 2.67 hours, a total of 0.8 parts of the solution containing 0.05 parts of t-butyl perbenzoate had been added. The mixture was white, opaque in color and all but 1.92 parts of the butyl acrylate had reacted. The viscosity of the mixture was 9,000 cs. at 25° C. and contained a large number of rodlike particles up to 0.75 millimeters in length.

EXAMPLE 3

A mixture consisting of 80 parts of hydroxyl-terminated polydimethylsiloxane (400 cs.), 54 parts of butyl acrylate and 66 parts of styrene was heated to 115° C. with agitation. A solution containing 0.4 parts of t-butyl perbenzoate in 6 parts of toluene was added in increments of 0.3 parts (0.02 parts of initiator) at intervals of 20 minutes. Most of the heat of reaction was evolved between the addition of the sixth and seventh increments, but the temperature never rose above 120° C. Examination of the reaction product revealed the presence of well formed rods.

EXAMPLE 4

A graft polymerization was carried out in accordance with the procedure described in Example 3, except that the temperature was allowed to rise to 125° C. Examination of the reaction product revealed the presence of elongated rodlike particles.

EXAMPLE 5

A graft polymerization was carried out in accordance with the procedure described in Example 3, except that the temperature was allowed to rise to 133° C. Again rodlike particles were present upon examination of the reaction product.

The particle size and viscosity in comparison with the temperature are illustrated in Table II. Although particles were formed in each example, elongated particles were formed only when the temperature was controlled by gradual addition of the initiator. The most highly elongated particles are formed at the lowest temperatures.

TABLE II

| Example No. | Graft Type | Maximum Temp., °C. | Particle Length, μ | Particle Diameter, μ | Viscosity, cp. |
|---|---|---|---|---|---|
| 1 | BA | 171 | 60 | 60 | 10,600 |
| 2 | BA | 123 | 750 | 160 | 9,000 |
| 3 | S-BA | 120 | 36 | 10 | 8,000 |
| 4 | S-BA | 125 | 16 | 4 | 4,800 |
| 5 | S-BA | 133 | 10 | 6 | 5,120 |

BA = Butyl acrylate
S-BA = Styrene-butyl acrylate

EXAMPLE 6

About 100 parts of each of the graft polymers prepared in the above examples (1–5) was mixed with 5 parts of ethyl silicate "40" and 0.5 parts of dibutyltin butoxychloride and cured at room temperature for 7 days. The physical test results illustrated in Table III show that polymers prepared by the gradual addition of the free-radical initiator have improved elongation and tear strength.

TABLE III

| Example No. | Graft Type | Tensile strength, psi. | Elongation, % | Tear strength, lb./in. | Hardness Shore A |
|---|---|---|---|---|---|
| 1 | BA | 65 | 90 | 10 | 19 |
| 2 | BA | 73 | 97 | 16 | 24 |
| 3 | S-BA | 1210 | 230 | 331 | 86 |
| 4 | S-BA | 1087 | 201 | 209 | 87 |
| 5 | S-BA | 1020 | 81 | 63 | 83 |

BA = Butyl acrylate
S-BA = Styrene-butyl acrylate

While specific embodiments of the invention have been shown and described, the invention should not be limited to the particular compositions. It is intended therefore to include all modifications within the spirit and scope of this invention.

The invention claimed is:

1. An improved method for preparing modified organopolysiloxanes by contacting a substantially linear organopolysiloxane in which the organo groups are selected from the class consisting of monovalent hydrocarbon radicals, halogenated monovalent hydrocarbon radicals and cyanoalkyl radicals with an organic compound containing ethylenic unsaturation, said compound being selected from the class consisting of straight chain hydrocarbons, vinyl halides, vinyl esters, styrene and ring substituted stryenes, acrylic acid and methacrylic acid, salts, esters and amides of acrylic acid and methacrylic acid, acrylonitrile, methacrylonitrile, vinyl pyridine, vinyl naphthalene, N- vinyl compounds and vinyl silicon compounds in the presence of a free-radical initiator; the improvement which comprises heating a preformed mixture consisting essentially of the organopolysiloxane and the organic compound, and thereafter gradually adding the initiator to the heated preformed mixture at such a rate that a substantially constant reaction temperature is maintained.

2. The method of claim 1 wherein the temperature is maintained such that the half-like of the initiator is between 0.25 and 10 hours.

3. The method of claim 1 wherein the temperature is maintained between 50° and 150° C.

4. The method of claim 1 wherein the organopolysiloxane is present in an amount of from 25 to 60 percent by weight based on the weight of the reactants.

5. The method of claim 1 wherein the free-radical initiator is dissolved in an inert organic solvent.

6. The method of claim 1 wherein the free-radical initiator is present in an amount of from 0.01 to 1.0 percent by weight based on the olefinic organic compound.

7. The method of claim 1 wherein the free-radical initiator is a peroxide.

* * * * *